United States Patent
Kim et al.

(10) Patent No.: US 9,269,348 B2
(45) Date of Patent: *Feb. 23, 2016

(54) SYSTEM AND METHOD FOR AUTOMATIC DETECTION OF ABNORMAL STRESS PATTERNS IN UNIT SELECTION SYNTHESIS

(71) Applicant: AT&T Intellectual Property I, L.P., Atlanta, GA (US)

(72) Inventors: Yeon-Jun Kim, Whippany, NJ (US); Mark Charles Beutnagel, Mendham, NJ (US); Alistair D. Conkie, San Jose, CA (US); Ann K. Syrdal, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,790

(22) Filed: Feb. 23, 2015

(65) Prior Publication Data

US 2015/0170637 A1 Jun. 18, 2015

Related U.S. Application Data

(63) Continuation of application No. 12/852,146, filed on Aug. 6, 2010, now Pat. No. 8,965,768.

(51) Int. Cl.
*G10L 13/00* (2006.01)
*G10L 13/08* (2013.01)
*G10L 13/10* (2013.01)
(Continued)

(52) U.S. Cl.
CPC .............. *G10L 13/10* (2013.01); *G10L 15/1807* (2013.01); *G10L 25/00* (2013.01)

(58) Field of Classification Search
USPC .................................................. 704/258, 260
See application file for complete search history.

(56) References Cited

U.S. PATENT DOCUMENTS

| | | | |
|---|---|---|---|
| 5,617,507 A | 4/1997 | Lee et al. | |
| 5,636,325 A | 6/1997 | Farrett | |
| 6,078,885 A * | 6/2000 | Beutnagel | G10L 15/063 704/231 |

(Continued)

OTHER PUBLICATIONS

Peter Ladefoged, "A Course in Phonetics", Harcourt Brace Jovanovich College Publishers, 1993. Book http://www/amazoncom/Course-Phonetics-CD-ROM-Peter-Ladefoged/dp/1428231269/ref=sr_1_1?s=books&ie=UTF8&qid=1344273685&sr=1-1&keywords=a+course+in +phonetics+peter+ladefoged.

(Continued)

*Primary Examiner* — Olujimi Adesanya

(57) ABSTRACT

Disclosed herein are systems, methods, and non-transitory computer-readable storage media for detecting and correcting abnormal stress patterns in unit-selection speech synthesis. A system practicing the method detects incorrect stress patterns in selected acoustic units representing speech to be synthesized, and corrects the incorrect stress patterns in the selected acoustic units to yield corrected stress patterns. The system can further synthesize speech based on the corrected stress patterns. In one aspect, the system also classifies the incorrect stress patterns using a machine learning algorithm such as a classification and regression tree, adaptive boosting, support vector machine, and maximum entropy. In this way a text-to-speech unit selection speech synthesizer can produce more natural sounding speech with suitable stress patterns regardless of the stress of units in a unit selection database.

19 Claims, 5 Drawing Sheets

(51) Int. Cl.
*G10L 15/18* (2013.01)
*G10L 25/00* (2013.01)

(56) References Cited

U.S. PATENT DOCUMENTS

| | | | |
|---|---|---|---|
| 6,260,016 B1 * | 7/2001 | Holm | G10L 13/10 704/200 |
| 6,438,522 B1 | 8/2002 | Minowa et al. | |
| 6,496,801 B1 * | 12/2002 | Veprek | G10L 13/08 704/260 |
| 6,601,029 B1 | 7/2003 | Pickering | |
| 6,847,931 B2 | 1/2005 | Addison et al. | |
| 6,961,704 B1 | 11/2005 | Phillips et al. | |
| 7,280,968 B2 | 10/2007 | Blass | |
| 7,356,468 B2 * | 4/2008 | Webster | G10L 13/10 704/258 |
| 8,126,717 B1 | 2/2012 | Strom | |
| 8,219,398 B2 | 7/2012 | Marple et al. | |
| 8,571,849 B2 | 10/2013 | Bangalore et al. | |
| 2002/0128841 A1 | 9/2002 | Kibre et al. | |
| 2003/0144842 A1 | 7/2003 | Addison et al. | |
| 2003/0163316 A1 | 8/2003 | Addison et al. | |
| 2003/0229494 A1 | 12/2003 | Rutten et al. | |
| 2004/0054534 A1 | 3/2004 | Junqua | |
| 2004/0067472 A1 * | 4/2004 | Polanyi | G09B 5/02 434/178 |
| 2004/0075677 A1 | 4/2004 | Loyall et al. | |
| 2004/0176960 A1 * | 9/2004 | Shpiro et al. | 704/277 |
| 2005/0065795 A1 | 3/2005 | Mutsuno et al. | |
| 2005/0144003 A1 | 6/2005 | Iso-Sipila | |
| 2006/0069559 A1 | 3/2006 | Ariyoshi et al. | |
| 2006/0074678 A1 * | 4/2006 | Pearson | G10L 13/10 704/267 |
| 2006/0229876 A1 | 10/2006 | Aaron et al. | |
| 2008/0040262 A1 | 2/2008 | D K et al. | |
| 2008/0145824 A1 | 6/2008 | Varon | |
| 2008/0270140 A1 | 10/2008 | Hertz et al. | |
| 2009/0070115 A1 | 3/2009 | Tachibana et al. | |
| 2009/0083036 A1 * | 3/2009 | Zhao | G10L 13/10 704/260 |
| 2009/0094035 A1 | 4/2009 | Conkie | |
| 2009/0198497 A1 | 8/2009 | Kwon | |
| 2009/0234652 A1 | 9/2009 | Kato et al. | |
| 2010/0017000 A1 | 1/2010 | Pulz et al. | |
| 2010/0082345 A1 * | 4/2010 | Wang | G10L 13/00 704/260 |
| 2010/0161327 A1 | 6/2010 | Chandra et al. | |

OTHER PUBLICATIONS

Monaghan, A.I.C. "Rhythm and stress-shift in speech synthesis",. *Computer Speech and Language*, vol. 4, pp. 71-78, 1990.

Black et al., "Issues in building general letter-to-sound rules", in *The 3rd ESCA Workshop on Speech Synthesis*, 1998, pp. 77-80.

Dou et al., "A Ranking Approach to Stress Prediction for Letter-to-Phoneme Conversion", in *Proceedings of the 47th Annual Meeting of the ACL and the 4th IJCNLP of the AFNLP*, Aug. 2009, pp. 118-126.

Kim et al., "Phonetic Enrichment Labeling in Unit Selection Synthesis", in *Proceedings Interspeech*, Pittsburgh, USA, 2006.

Conkie et al., "Improving Preselection in Unit Selection Synthesis". in *Proceedings Interspeech*. Brisbane, Australia, 2008, pp. 585-588.

Anne Cutler, "Errors of Stress and Intonation", chapter 4, pp. 67-80, Academic Press Inc., 1980, ISBN 0-12-268980-1.

Cynthia G. Clopper, "Frequency of stress patterns in English: A computational analysis", in *IULC Working Papers Online*, 2002.

Coker et al., "Morphology and rhyming: Two powerful alternatives to letter-to-sound rules for speech synthesis". In *Proceedings of ESCA Workshop on Speech Synthesis*. Autrans, France, 1990, pp. 83-86.

Kenneth Church, "Stress Assignment in Letter-to-Sound Rules for Speech Synthesis", in *ACL*, 1985, pp. 246-253.

Kim et al., "Automatic Segmentation combining an HMM-based Approach and Spectral Boundary Correction", in *Proceedings ICSLP*. Denver, USA, 2002.

Ian H. Witten and Eibe Frank, "Data Mining: Practical Machine Learning Tools and Techniques", Morgan Kaufmann; 2 edition, Jun. 10, 2005. ISBN:0120884070, Book http://www.amazon.com/Data-Mining-Practical-Techniques-Management/dp/0123748569.

Bilmes et al., Machine Learning in Speech and Language Processing,. In *Proceedings ICASSP*, Philadelphia, PA, 2005.

Y-J Kim et al., "Automatic Detection of Abnormal Stress Patterns in Unit Selection Synthesis," Sep. 26-30, 2010, in Proc. of Interspeech, 2010, pp. 170-173.

* cited by examiner

SYSTEM AND METHOD FOR AUTOMATIC DETECTION OF ABNORMAL STRESS PATTERNS IN UNIT SELECTION SYNTHESIS

PRIORITY INFORMATION

The present application is a continuation of U.S. patent application Ser. No. 12/852,146, filed Aug. 6, 2010, the content of which is incorporated herein by reference in its entirety.

BACKGROUND

1. Technical Field

The present disclosure relates to speech synthesis and more specifically to detecting and correcting abnormal stress patterns in synthetic speech.

2. Introduction

Spoken English and numerous other spoken languages include stress patterns which "sound" natural to native speakers. In some instances, stress patterns can disambiguate otherwise confusable words, such as 'ad-dict (an addicted person) and ad-'dict (to make someone dependent on something). Foreign speakers often pronounce the correct sequence of sounds or phones, but with the wrong stress pattern, making their speech difficult to recognize for native speakers. Foreign speakers are often not aware of specific stress patterns in English words and therefore stress the wrong syllables. For example, English has strong-weak alternating rhythm and each word has its own specific stress pattern. Similarly, a text-to-speech (TTS) synthesis system sometimes produces incorrect stress patterns, which makes a TTS system sound like a foreign speaker. An incorrect stress pattern is not only disruptive by itself, but also degrades intelligibility and naturalness of TTS synthesis.

Previous work related to stress in speech synthesis has concentrated on stress assignment to predict the correct stress patterns from given text. Traditional parametric speech synthesis produces a stream of parameters from rules or from statistics based on a training corpus. Unit selection synthesis, which can produce higher quality speech by concatenating natural speech segments with less signal processing, brings an unexpected complication. Acoustic units chosen from various locations throughout a recorded corpus and concatenated in novel combinations may convey the wrong lexical stress pattern even though the correct pattern was predicted by the TTS frontend. Accordingly, what is needed is improved handling of stress in speech synthesis.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically detecting abnormal stress patterns in unit-selection speech synthesis. For example, one abnormal stress patterns is re-ci-'tal, where the usual stress pattern is re-'ci-tal. Abnormal stress patterns can include incorrect pitch, amplitude, duration, and/or pronunciation of one or more speech element, such as a syllable, consonant, or pause in speech. Abnormal stress patterns can also include lexical stress, sentential stress, primary stress, and secondary stress. Stress of a given syllable, for example, is often measured in relation to neighboring syllables.

A system practicing the method first detects incorrect stress patterns in selected acoustic units representing speech to be synthesized, then corrects the incorrect stress patterns in the selected acoustic units to yield corrected stress patterns. The system can then optionally synthesize speech based on the corrected stress patterns. A post-processing module of a text-to-speech system can correct the incorrect stress patterns. In one aspect the system synthesizes speech using a unit-selection based text-to-speech approach. Some variations of this approach include correcting the incorrect stress patterns occurs before waveform synthesis of the selected acoustic units. The system can also classify incorrect stress patterns based on a confidence score for the selected acoustic units by a machine learning algorithm. Classification and regression tree, adaptive boosting, support vector machine, and maximum entropy are all examples of suitable machine learning algorithms.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
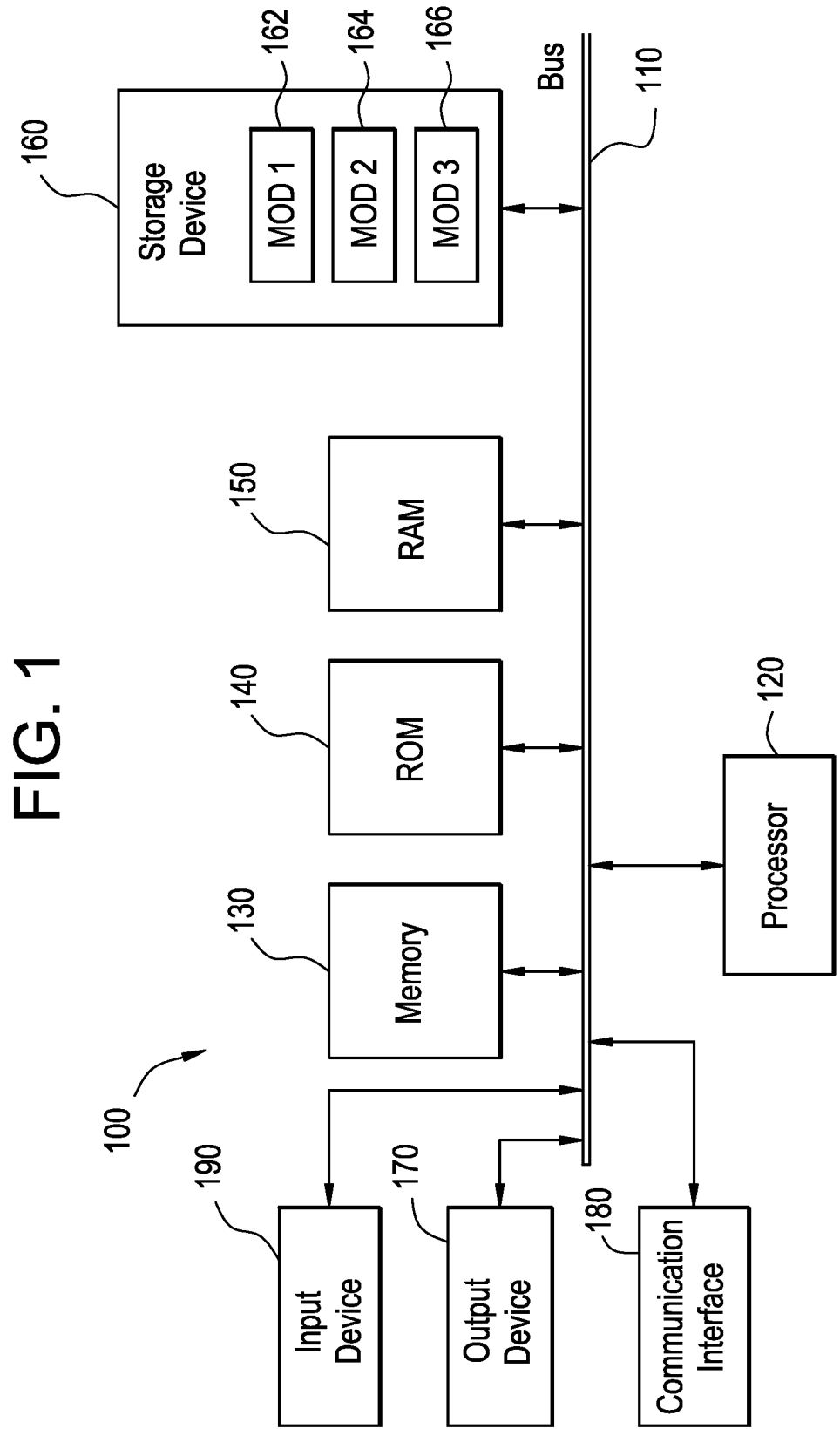
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for correcting abnormal stress patterns in synthesized speech. A brief introductory description of the disclosure is presented, followed by a description of a basic general purpose system or computing device in FIG. 1 which can be employed to practice the concepts is disclosed herein. A more detailed description of methods and graphical interfaces will then follow.

This disclosure relates to a method to detect and remedy lexical stress errors in unit selection synthesis automatically using machine learning algorithms. This approach can detect unintended stress patterns in selected speech units after unit selection, based on features available in the unit database, and thus can modify the units during and/or before waveform synthesis to correct errors and produce an acceptable stress pattern.

For example, the English word banana has a specific stress pattern: ba-'na-na. The system can measure the stress on the middle syllable and compare the average sound of the middle syllable with the duration, amplitude, and pitch of surrounding syllables. During unit-selection, the system identifies acoustic units that, if combined, would yield the stress pattern 'ba-na-na. The approaches herein can correct such incorrect stress patterns before they are produced as unnatural sounding synthesized speech, such as 'ba-na-na or ba-na-'na.

Alternately, the system can detect if the correct types of stress are being used. For example, in the word ba-'na-na the middle syllable is typically stressed by a slightly longer duration and slightly higher pitch. In one incorrect stress pattern, the middle syllable of banana is stressed by amplitude, not duration and pitch. The system can correct the word banana to use the appropriate type or types of stress even if the stress pattern is, at a high level, correct. Alternatively, the system can detect incorrect stress patterns accounting for different types of stress.

Several alternative machine learning algorithms trained with acoustic measurements from natural utterances and corresponding stress patterns can detect stress patterns, such as the Classification and Regression Tree (CART) algorithm, Adaptive Boosting (AdaBoost)+CART, Support Vector Machine (SVM), and Maximum Entropy (MaxEnt). Experimental results show that MaxEnt performs the best in the natural stress pattern classification. Although classification rates are generally good, these algorithms sometimes produce a number of false alarms. However, the experimental results show that signal modifications based on false positives do little harm to the overall quality and naturalness of the speech synthesis output.

In one aspect, the solution disclosed herein is to model human perception concerning lexical stress patterns and make use of it to detect abnormal synthesized stress patterns. The perceptual-level data as heard by listeners is very expensive to collect. Instead of approaching human stress perception directly, this approach assumes that how humans produce stress should be similar to how humans perceive stress and model the correlation between stress patterns and acoustic measurements. The machine learning algorithms can model human perception and can be trained with the given acoustic parameters from each syllable in a word and the corresponding stress pattern as a target class. Then a speech synthesizer uses the updated stress patterns to produce synthesized speech. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic system components, the disclosure now turns to a more detailed discussion of the exemplary approaches for detecting and correcting abnormal stress patterns in synthesized speech. While English is discussed here as an example language, the principles herein can be modified for use with other spoken languages based on language-specific stress patterns.

English has strong-weak alternating rhythm and each word has its own specific stress pattern. While many languages have an entirely predictable stress pattern (e.g. either the first or the last syllable in a multi-syllable word), various stress patterns can be found in words from English and other Germanic languages. Vowel identities can change depending on the existence of stress. For example, unstressed vowels in American English are often reduced to ɔ (schwa or /ax/), while other languages have different stress patterns. In Russian a stressed o is pronounced ō and an unstressed o is pronounced ŏ.

Sometimes, speech produced by unit selection synthesis violates the listener's expectations. Even if each unit's stress and rhythm is appropriate for its local context, juxtaposing them with units from other contexts can interfere with the perceived stress. For example, a vowel with secondary stress from a louder word may overwhelm a primary stressed vowel from a softer word in different context. The challenge is to mitigate such problems while still preserving the natural variations in recorded speech available to unit selection synthesis. If a speech synthesizer can accurately predict and synthesize correct stress patterns, the speech output is much higher quality and sounds more natural.

Unit selection is typically implemented as a Viterbi search and all decisions are strictly local. Cost functions evaluate the current candidate unit in relation to predicted features and adjacent units, which does not allow for any higher-level view. In one implementation, this approach introduces a post-processing module to detect abnormal stress patterns and remedy them in unit selection synthesis shown in the exemplary flow 200 of post-processing 208 in a unit-selection text-to-speech system of FIG. 2. The system receives text 202 to convert to speech. A front end 204 processes the speech and can include a text normalization module 204A, a linguistic analysis module 204B, and a prosody generation module 204C, as well as other modules. Then the system performs unit selection 206. A post-processing module 208 of the system can then perform acoustic measurement 208A, stress pattern classification 208B, and matching and modification 208C. The matching and modification 208C can use lexical stress pattern 210 information fed from the front-end 204. After the post-processing 208 detects and corrects stress patterns in the output from the unit selection module 206, the system performs signal processing 212 to produce speech 214. Unit selection and/or the post-processing can be based on defined possible stress patterns for English (or other language) words and based on measured acoustic parameters of units in a recorded corpus. The system can model human perception related to acoustic parameters using several machine learning algorithms.

The disclosure now turns to lexical stress patterns. A correctly produced sentence in English comes from the successful imposition of stresses at multiple levels. One such level is lexical stress, or the correct syllable in a multi-syllabic word. Another level is sentential stress, or the correct placement of stress within the sentence. Many factors can influence the placement of sentential stress, including type of sentence, emotional status, context, intentions, and so forth. On the other hand, prediction of lexical stress is well established and is the first step in prosody realization. However, mistakes in synthesizing the correct stress patterns for isolated words can still occur in unit selection synthesis. In one aspect, this approach focuses on the correlation between lexical stress patterns and acoustic realization in natural utterances.

Because stress can be assigned to any syllable in a multi-syllabic word in English, a number of stress patterns are possible. Stress patterns can be differentiated solely by the position of the primary stress in a word, or by a combination of primary stress position and secondary stress position. A combination of stresses allows for a more natural stress pattern, but can also introduce a wider range of errors.

The system can tag a TTS voice database with the lexical stress patterns predicted by the TTS front-end 204, such as AT&T Natural Voices™, a unit selection TTS system. Table 1, below, shows the stress patterns of an exemplary set of 3- and 4-syllable words. The middle column shows the stress pattern as 0s, 1s, and 2s, where 0 indicates no stress, 1 indicates primary stress, and 2 indicates secondary stress. These stress patterns can be used as target classes for machine learning algorithms.

TABLE 1

Exemplary lexical stress patterns in 3 and 4 syllable words.

|  | Stress Pattern | Example |
|---|---|---|
| 3-syllable words | 102 | BALtiMORE |
|  | 100 | CItizen |
|  | 010 | dePARTment |
|  | 201 | ILLiNOIS |
|  | 102 | JACKsonVILLE |
|  | 210 | MONTAna |
|  | 120 | WESTMINster |
| 4-syllable words | 0100 | aMErican |
|  | 0102 | reLAtionSHIP |
|  | 1000 | TEMperature |
|  | 1002 | LIbertyTOWN |
|  | 1020 | OperAtor |
|  | 1200 | PAINSTAkingly |
|  | 2010 | PENNsylVAnia |
|  | 2100 | MONGOlia |
|  | 0102 | comMUNiCATE |

Primary stress is in bold upper case, and secondary stress is in non-bold upper case.

Even though any stress value can be assigned to any syllable in an English word, actual stress patterns are not evenly distributed, as shown in Table 1. Specifically, very few, if any, 4-syllable words have the primary stress in the final syllable. Another interesting result is that, as a whole, more 4-syllable words have the primary stress in the second or the third syllable than ones which have the primary stress in the first syllable.

The disclosure now turns to a discussion of acoustic measures for stress. A stressed syllable is generally uttered with a greater amount of energy than an unstressed syllable. The greater energy is realized in various acoustic forms in speech, such as an increase in pitch (fundamental frequency), in amplitude, or in duration.

To learn how humans use acoustic parameters to deliver lexical stress patterns, the system measures pitch, amplitude and duration quantitatively from a database, such as a database of a female TTS voice talent's natural utterances. Prior to acoustic measurement, audio files in the unit database were energy-normalized by sentence in order to reduce unwanted variations from a series of recording sessions, but some amount of variation cannot be avoided. Pitch and duration in speech were kept in their natural forms without modification. Pitch and amplitude were both measured from speech files at 10 millisecond intervals and then averaged at the nucleus of the syllable. Log values are used rather than raw values for amplitude measurement. Durations of phone segments were computed from automatically segmented phone boundaries. Another indication of stress is the rise in pitch that usually occurs caused by additional muscular activity. The system can model these phenomena with the slope of pitch ($\Delta f0$) at increments such as every half-phone.

In addition to features mentioned above, certain normalized values of the parameters can depend on phone identity: duration and amplitude. Some vowel sounds have more acoustic energy than others due to the different degrees of mouth opening. For example, diphthongs tend to be longer than other vowels. The sound /ay/ in 'time' is typically longer than /aa/ in 'Tom' in comparable contexts. By introducing Z-score at the n-th syllable, $Z_i(n)$, in Equation (1), the system can use stylized stress patterns independent of the phone's intrinsic variations.

$$Z_i(n) = \frac{(X_i(n) - \mu_i)}{\delta_i} \quad \text{Equation (1)}$$

where $\mu_i$ and i are the mean and the standard deviation of one feature (e.g. duration) across all segments i of a given phone type in the target speaker's database.

Figure 3A:
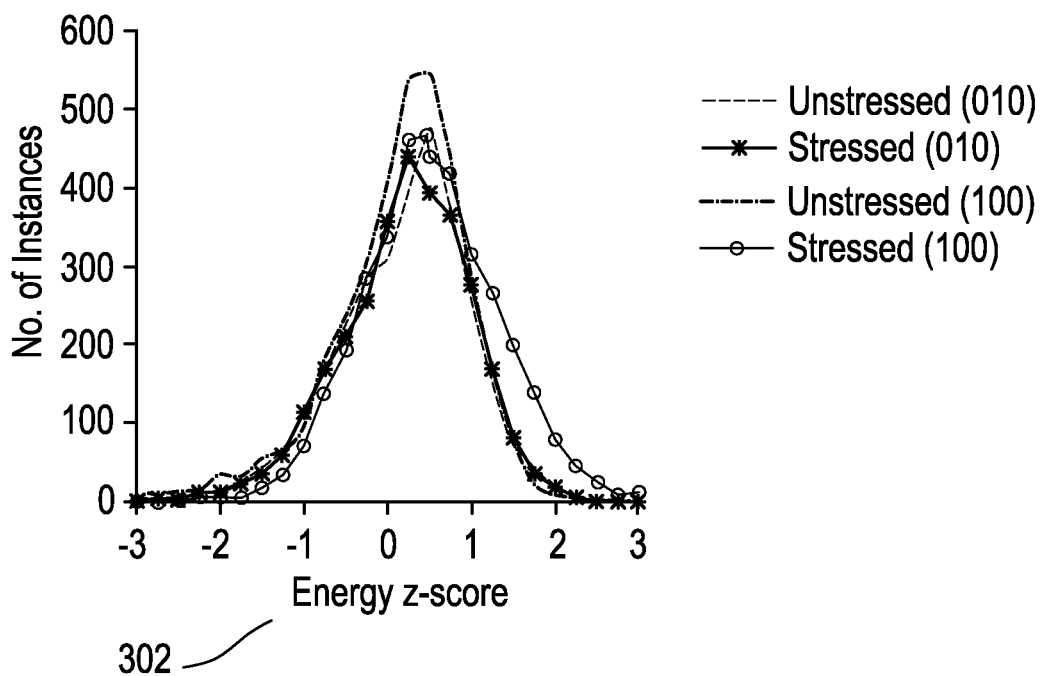
FIG. 3A illustrates an exemplary distribution of Z-score energy.
Figure 3B:
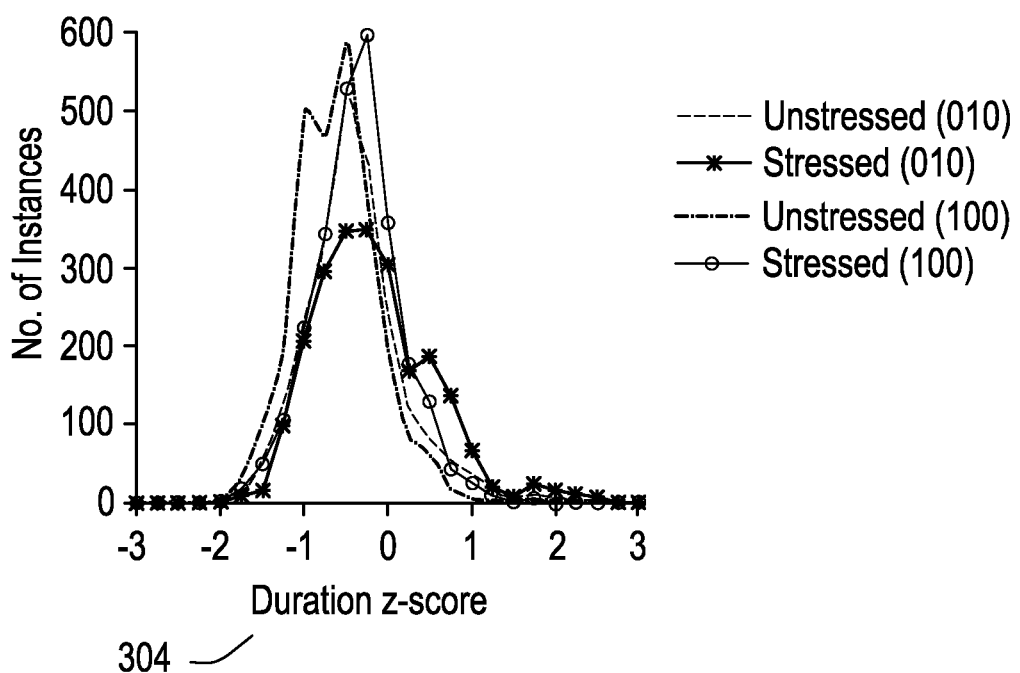
FIG. 3B illustrates an exemplary duration of stressed and unstressed syllables.

The amplitude and the duration of a stressed syllable are increased compared to nearby unstressed vowels. However, as shown in the charts 302, 304 of FIG. 3, it is difficult to draw a clear line between the stressed and the unstressed in actual data. Each plot shows the distributions of energy (a) or duration (b) at both the stressed syllable and the unstressed syllable for each of two stress patterns of 3-syllable words. The average amplitude and duration in stressed syllables are slightly larger than those at unstressed syllables, but it is not a distinct bimodal distribution. This may be due to variation by context and by position within phrases. The system can perform additional normalization within words considering phrase position and speaking rate. For example, the final syllable in 3-syllable words tends to be longer regardless of stress, so compensation for this intrinsic bias may help. Some ways to compensate for this intrinsic bias can include isolating words or using words from similar contexts.

The disclosure now turns to a discussion of stress pattern classification using machine learning algorithms. The system can model human perception concerning lexical stress patterns and make use of the modeled human perception to detect abnormal synthesized stress patterns. However, perceptual-level data as heard by listeners is very expensive to collect. Instead of approaching human stress perception directly, the system can assume that how humans produce stress is similar to how humans perceive stress and model the correlation between stress patterns and acoustic measurements. Machine learning algorithms can be used to model human perception. The machine learning algorithms can be trained with given acoustic parameters from each syllable in a word and the corresponding stress pattern as a target class.

In one variation, the system uses machine learning algorithms from the Waikato Environment for Knowledge Analysis (WEKA) suite which is a collection of machine learning algorithms for data mining tasks. WEKA also provides a convenient graphical user interface to develop and test learning algorithms. Four exemplary algorithms are discussed herein, but additional algorithms and variations of these exemplary algorithms can also be used. The first exemplary algorithm is the CART, or classification and regression tree, algorithm decides the target class with the given input variables. Quinlan's C4.5 decision tree is one implementation of CART. The second exemplary algorithm is Adaptive Boosting (or AdaBoost), which calls a weak classifier repeatedly and updates the importance of training examples to focus the misclassified instances. AdaBoost can be used in conjunction with the CART algorithm or other algorithms. The third exemplary algorithm is a support vector machine (SVM) algorithm which maps the examples to the separate categories in order to divide the examples by a clear gap as wide as possible. One implementation of SVM is a sequential minimal optimization algorithm for training a support vector classifier. The fourth exemplary algorithm is a maximum entropy (MaxEnt) algorithm, which builds and uses a multinomial logistic regression model with a ridge estimator. Like many other regression models, MaxEnt makes use of several predictor variables that may be either numerical or categorical.

Each of these machine learning algorithms can be trained by supervised learning methods with acoustic measurements input parameters and stress patterns as the target class. In experimental classification tests, MaxEnt outperformed the other algorithms by correctly classifying 83.3% stress patterns for 3-syllable words and 88.7% for 4-syllable words, but all the algorithms classified 4-syllable stress patterns correctly more often than 3-syllable patterns.

In these experimental classification tests, when the system applied models trained with natural utterances to classify the stress pattern of a synthesized word, the models' performance degraded. They produced a huge number of false negatives which sound reasonable to a native listener, but disagree with the given lexical stress patterns.

Figure 4:
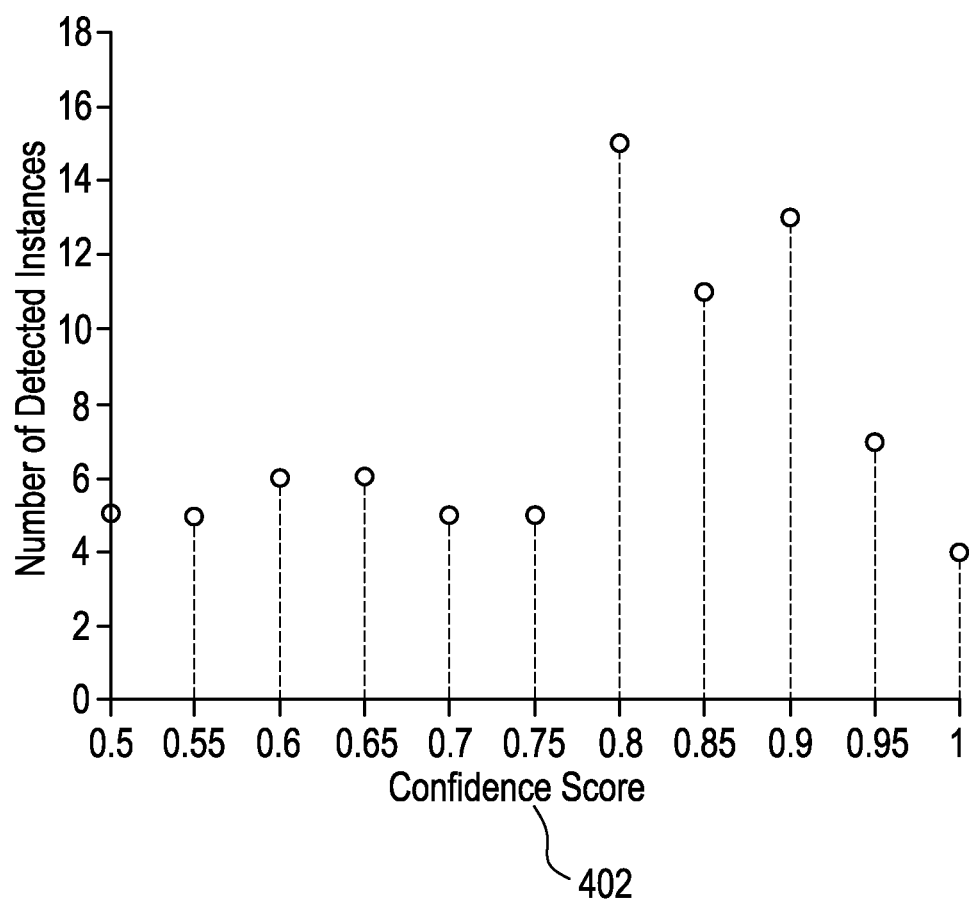
FIG. 4 illustrates a number of abnormal stress patterns perceived by a native listener in an example set of four-syllable synthesized words.

In the experiments, misclassified synthesis words were played to a native listener who was asked to judge whether the misclassified pattern is truly off from the stress pattern that he expected, without knowing its confidence score. FIG. 4 shows that more words truly violate human perception (true negative) when their confidence scores are higher. The confidence score from the classification algorithm is relevant to the listener's perception. The confidence score is more effective when the number of false alarms is reduced.

Machine learning techniques can be used to model human perception of stress patterns, detect abnormal stress patterns in unit selection synthesis, and remedy them using signal processing. One purpose is to detect incorrect stress patterns after acoustic units are selected but before waveform synthesis. At that point, signal processing can be directed to modify the synthesis and produce an improved stress pattern compared to the default speech output.

Figure 5:
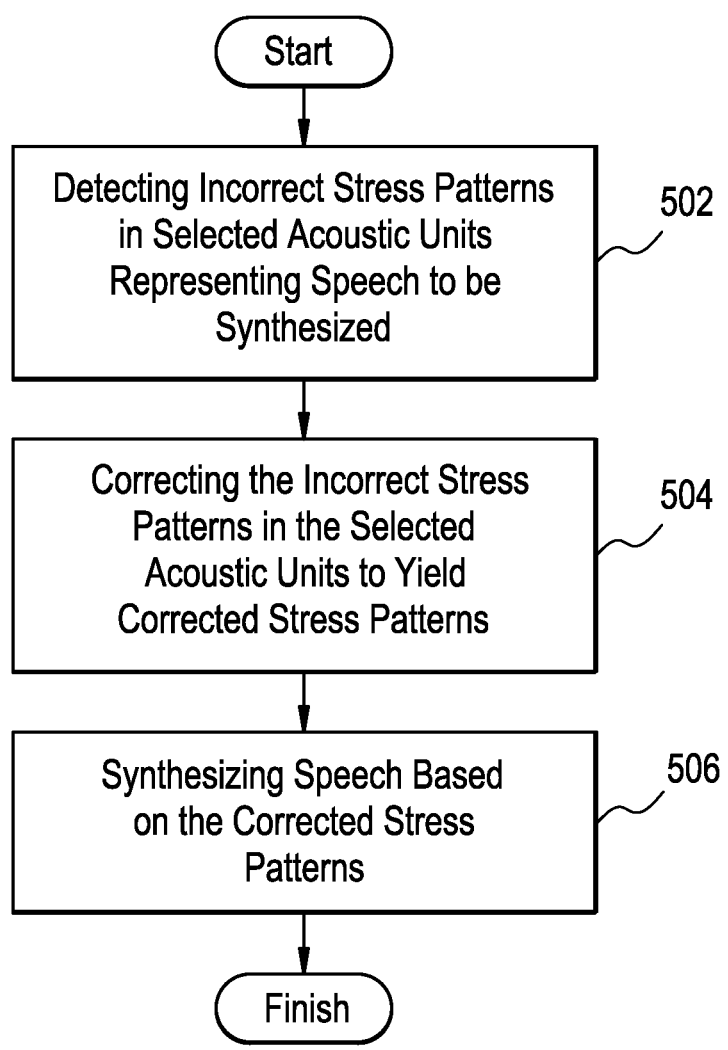
FIG. 5 illustrates an example method embodiment.

Having disclosed some basic system components, the disclosure now turns to the exemplary method embodiment for detecting and correcting abnormal stress patterns in unit-selection speech synthesis as shown in FIG. 5. For the sake of clarity, the method is discussed in terms of an exemplary system 100 as shown in FIG. 1 configured to practice the method. The system 100 can include and/or interact with all or part of a unit-selection speech synthesizer. The system 100 detects incorrect stress patterns in selected acoustic units representing speech to be synthesized (502). Stress patterns can be correct or incorrect in the context of a word or phrase in which the selected acoustic units would be spoken for a given norm. For example, the norm can be English with a Midwest accent, Peninsular Spanish, or any other norm. For example, the word ba-'na-na in English has stress on the middle syllable. An incorrect stress pattern for the word banana can place the wrong type of stress on the middle syllable, can place the correct type of stress on the wrong syllable, can place the correct type of primary stress on the correct syllable but place the secondary stress on the wrong syllable, or any other pattern of stress that does not match the expected norm. One example of an incorrect stress pattern is ba-'na-'na where the first and second syllables of banana are pronounced properly, but the third syllable is pronounced with the same stress as the second syllable.

Stress can be detected based on pitch, amplitude, and/or duration. Stress patterns can include one or more of lexical stress, sentential stress, primary stress, and secondary stress, as set forth above. Stress patterns can be detected at multiple levels. For instance, even if stress patterns for each individual word are correct, the overall sentence or paragraph stress may be incorrect. The system can perform multiple passes of stress pattern detection simultaneously or sequentially. Further, the system can consider stress patterns in relation to neighboring speech units. For example, one acoustic unit can appear to be a stressed acoustic unit because it is too loud, but if the acoustic units on either side of that acoustic unit are also similarly loud, then that acoustic unit may not be stressed.

Figure 2:
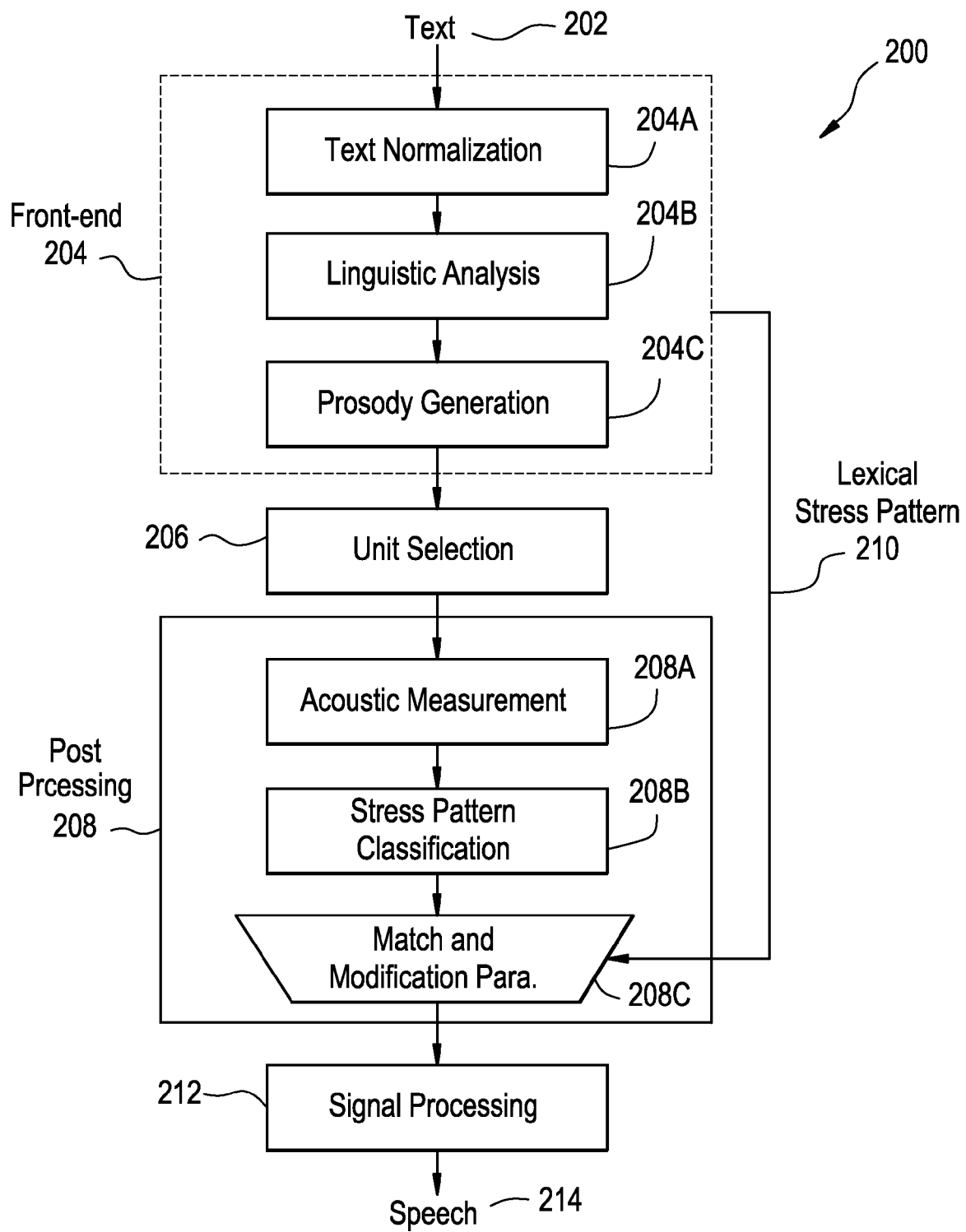
FIG. 2 illustrates an exemplary flow of post-processing in a unit-selection text-to-speech system.

The system 100 corrects the incorrect stress patterns in the selected acoustic units to yield corrected stress patterns (504). The system 100 can correct these incorrect stress patterns in a post-processing module before waveform synthesis or signal processing of the selected acoustic units. FIG. 2, discussed above, illustrates one exemplary configuration of this variation. The system 100 can further classify incorrect stress patterns based on confidence scores for selected acoustic units. Several exemplary machine learning algorithms can classify incorrect stress patterns, including CART, AdaBoost, SVM, and MaxEnt. The system 100 can then optionally synthesize speech based on the corrected stress patterns (506) or pass the corrected stress patterns to a speech synthesizer.

Correct and incorrect stress patterns exist at a phrase level, sentence level, and at other levels. In one aspect, the system performs multiple passes either in series or in parallel at different levels to detect incorrect stress patterns. The system can, for example, run a word level detection of incorrect stress patterns, correct incorrect patterns, then run a phrase level detection of incorrect stress patterns, correct those patterns if necessary, then run a sentence level detection and fix any incorrect patterns at that level.

The approaches disclosed herein can provide an important benefit of implementing correct stress patterns which in turn leads to higher quality, more intelligible, and more natural speech synthesis. This approach automatically detects incorrect stress patterns after acoustic units are selected but before waveform synthesis and fixes mistakes in the system by using signal processing to produce an improved speech synthesis output compared to the default speech output. Even potentially unnecessary signal modifications caused by false alarms in stress pattern detection are not especially harmful to the speech output.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving a stress pattern for both a language and an accent in the language;
   detecting, according to the stress pattern, incorrect stress patterns in selected acoustic units representing speech to be synthesized, wherein the selected acoustic units were selected by a separate unit-selection speech synthesizer;
   performing an analysis of the incorrect stress patterns, wherein the analysis comprises a word level analysis, a phrase level analysis, and a sentence level analysis on the incorrect stress patterns, wherein the word level analysis, the phrase level analysis, and the sentence level analysis are performed in series; and
   modifying, via a processor and prior to waveform synthesis, the incorrect stress patterns in the selected acoustic units according to the analysis, to yield corrected stress patterns, wherein the corrected stress patterns conform to the stress pattern for the language.

2. The method of claim 1, wherein the word level analysis, the phrase level analysis, and the sentence level analysis are performed in parallel.

3. The method of claim 1, wherein the detecting of incorrect stress patterns, the performing of the analysis of the incorrect stress patterns, and the modifying of the incorrect stress patterns is performed on individual words.

4. The method of claim 1, wherein the detecting of incorrect stress patterns, the performing of the analysis of the incorrect stress patterns, and the modifying of the incorrect stress patterns is performed on phrases.

5. The method of claim 1, wherein the detecting of incorrect stress patterns, the performing of the analysis of the incorrect stress patterns, and the modifying of the incorrect stress patterns is performed on sentences.

6. The method of claim 1, further comprising synthesizing speech according to the corrected stress patterns.

7. The method of claim 1, wherein modifying the incorrect stress patterns occurs before waveform synthesis of the selected acoustic units.

8. The method of claim 1, wherein the stress pattern comprises one of lexical stress, sentential stress, primary stress, and secondary stress.

9. A system comprising:
   a processor; and
   a computer-readable storage medium having instructions stored which, when executed by the processor, result in the processor performing operations comprising:
      receiving a stress pattern for both a language and an accent in the language;
      detecting, according to the stress pattern, incorrect stress patterns in selected acoustic units representing speech to be synthesized, wherein the selected acoustic units were selected by a separate unit-selection speech synthesizer;
      performing an analysis of the incorrect stress patterns, wherein the analysis comprises a word level analysis, a phrase level analysis, and a sentence level analysis on the incorrect stress patterns, wherein the word level analysis, the phrase level analysis, and the sentence level analysis are performed in series; and
      modifying, via a processor and prior to waveform synthesis, the incorrect stress patterns in the selected acoustic units according to the analysis, to yield corrected stress patterns, wherein the corrected stress patterns conform to the stress pattern for the language.

10. The system of claim 9, wherein the detecting of incorrect stress patterns, the performing of the analysis of the incorrect stress patterns, and the modifying of the incorrect stress patterns is performed on individual words.

11. The system of claim 9, wherein the detecting of incorrect stress patterns, the performing of the analysis of the incorrect stress patterns, and the modifying of the incorrect stress patterns is performed on phrases.

12. The system of claim 9, wherein the detecting of incorrect stress patterns, the performing of the analysis of the incorrect stress patterns, and the modifying of the incorrect stress patterns is performed on sentences.

13. The system of claim 9, the computer-readable storage medium having additional instructions stored which, when executed by the processor, result in operations comprising synthesizing speech according to the corrected stress patterns.

14. The system of claim 9, wherein modifying the incorrect stress patterns occurs before waveform synthesis of the selected acoustic units.

15. The system of claim 9, wherein the stress pattern comprises one of lexical stress, sentential stress, primary stress, and secondary stress.

16. A computer-readable storage device having instructions stored which, when executed by a computing device, result in the computing device performing operations comprising:
   receiving a stress pattern for both a language and an accent in the language;
   detecting, according to the stress pattern, incorrect stress patterns in selected acoustic units representing speech to be synthesized, wherein the selected acoustic units were selected by a separate unit-selection speech synthesizer;
   performing an analysis of the incorrect stress patterns, wherein the analysis comprises a word level analysis, a phrase level analysis, and a sentence level analysis on the incorrect stress patterns, wherein the word level analysis, the phrase level analysis, and the sentence level analysis are performed in series; and
   modifying, via a processor and prior to waveform synthesis, the incorrect stress patterns in the selected acoustic units according to the analysis, to yield corrected stress patterns, wherein the corrected stress patterns conform to the stress pattern for the language.

17. The computer-readable storage device of claim 16, having additional instructions stored which, when executed by the computing device, result in operations comprising synthesizing speech according to the corrected stress patterns.

18. The computer-readable storage device of claim 16, wherein modifying the incorrect stress patterns occurs before waveform synthesis of the selected acoustic units.

19. The computer-readable storage device of claim 16, wherein the stress pattern comprises one of lexical stress, sentential stress, primary stress, and secondary stress.

* * * * *